United States Patent
Onyekwelu et al.

(10) Patent No.: US 10,805,801 B1
(45) Date of Patent: Oct. 13, 2020

(54) AUTOMATIC MOBILE DEVICE USAGE RESTRICTION

(71) Applicant: International Business Machines Corporation, Armonk, NY (US)

(72) Inventors: Adaoha Onyekwelu, Wappingers Falls, NY (US); Kevin Bruckner, Wappingers Falls, NY (US); Ann Novelli, Austin, TX (US); Theresa Hans, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/590,735

(22) Filed: Oct. 2, 2019

(51) Int. Cl.
| | | |
|---|---|---|
| *H04W 48/02* | (2009.01) | |
| *H04W 12/06* | (2009.01) | |
| *H04W 4/30* | (2018.01) | |
| *H04W 12/08* | (2009.01) | |
| *H04W 12/00* | (2009.01) | |
| *H04L 12/26* | (2006.01) | |

(52) U.S. Cl.
CPC ....... *H04W 12/0605* (2019.01); *H04L 43/065* (2013.01); *H04W 4/30* (2018.02); *H04W 12/0027* (2019.01); *H04W 12/00508* (2019.01); *H04W 12/0802* (2019.01); *H04W 48/02* (2013.01)

(58) Field of Classification Search
CPC ....... H04W 48/02; H04W 48/10; H04W 4/70; H04W 4/90; H04W 74/002; H04W 8/02; H04W 48/04; H04W 48/06; H04W 48/08; H04W 4/30; H04W 12/00508; H04W 12/0027; H04W 12/0605; H04W 12/0802; H04W 12/02
See application file for complete search history.

(56) References Cited

U.S. PATENT DOCUMENTS

| | | | |
|---|---|---|---|
| 4,613,845 A | 9/1986 | Du Bois | |
| 9,452,735 B2 | 9/2016 | Miller et al. | |
| 9,690,933 B1 * | 6/2017 | Singh | G06F 21/56 |
| 10,505,959 B1 * | 12/2019 | Wang | G06F 21/50 |
| 2008/0034424 A1 * | 2/2008 | Overcash | G06F 21/55 726/22 |

(Continued)

OTHER PUBLICATIONS

Charniya et al. "Drunk driving and drowsiness detection." 2017 International Conference on Intelligent Computing and Control (I2C2). IEEE, 2017.

(Continued)

*Primary Examiner* — Jean A Gelin
(74) *Attorney, Agent, or Firm* — Cantor Colburn LLP; Teddi Maranzano (57) ABSTRACT

Techniques for automatic mobile device usage restriction are described herein. An aspect includes monitoring user data of a user of a mobile device from a plurality of data sources in the mobile device. Another aspect includes learning normal behavior of the user based on the monitoring. Another aspect includes identifying outlier behavior by the user that deviates from the normal behavior based on the monitoring. Another aspect includes determining a restriction state based on the outlier behavior. Yet another aspect includes restricting access to at least one functionality of the mobile device based on the restriction state.

20 Claims, 3 Drawing Sheets

(56) References Cited

U.S. PATENT DOCUMENTS

| | | | |
|---|---|---|---|
| 2009/0049518 A1 | 2/2009 | Roman et al. | |
| 2011/0004818 A1* | 1/2011 | Sugaya | H04L 1/244 |
| | | | 714/807 |
| 2011/0009107 A1* | 1/2011 | Guba | H04W 4/027 |
| | | | 455/418 |
| 2011/0105097 A1* | 5/2011 | Tadayon | H04W 4/50 |
| | | | 455/418 |
| 2011/0275521 A1* | 11/2011 | Stemmle | H01B 12/02 |
| | | | 505/163 |
| 2011/0295444 A1 | 12/2011 | Westra et al. | |
| 2012/0243477 A1* | 9/2012 | Shinada | H04W 12/06 |
| | | | 370/328 |
| 2013/0227711 A1 | 8/2013 | MacPherson et al. | |
| 2013/0345897 A1* | 12/2013 | Sakuma | G06F 17/00 |
| | | | 701/1 |
| 2014/0113593 A1 | 4/2014 | Zhou et al. | |
| 2016/0363914 A1* | 12/2016 | Kim | G06F 3/015 |
| 2017/0032588 A1* | 2/2017 | Ma | G08G 1/20 |
| 2017/0289168 A1* | 10/2017 | Bar | G06F 21/316 |
| 2019/0020669 A1* | 1/2019 | Glatfelter | H04L 63/1416 |
| 2019/0036948 A1* | 1/2019 | Appel | H04L 63/1441 |
| 2019/0132224 A1* | 5/2019 | Verma | H04L 47/2441 |
| 2019/0188453 A1* | 6/2019 | Ahn | H04M 1/72555 |
| 2019/0220863 A1* | 7/2019 | Novick | G06Q 20/10 |
| 2019/0346901 A1* | 11/2019 | Gupta | G06F 1/1694 |
| 2020/0053096 A1* | 2/2020 | Bendersky | H04W 12/0605 |
| 2020/0066069 A1* | 2/2020 | Kapoor | G07C 5/008 |
| 2020/0075167 A1* | 3/2020 | Srivastava | G16H 50/20 |

OTHER PUBLICATIONS

Fugiglando et al. "Driving behavior analysis through can bus data in an uncontrolled environment." IEEE Transactions on Intelligent Transportation Systems 99 (2018): 1-12.

Sakairi et al. "Simultaneous detection of breath and alcohol using breath-alcohol sensor for prevention of drunk driving." IEICE Electronics Express 7.6 (2010): 467-472.

* cited by examiner

AUTOMATIC MOBILE DEVICE USAGE RESTRICTION

BACKGROUND

The present invention generally relates to computer systems, and more specifically, to automatic mobile device usage restriction.

There currently exist a variety of portable computing devices (i.e., mobile devices), such as wireless computing devices, mobile telephones (e.g., cellular telephones, internet protocol (IP) telephones, smartphone devices, etc.), personal digital assistants (PDAs), tablets, laptop computers, wireless computers, etc., which may be relatively small, lightweight, and easily carried by users. These mobile devices can communicate over wireless networks, including Wi-Fi and cellular networks. A mobile device may be configurable by a user, for example, allowing the user to set permissions and/or to block unwanted contact from a specific number.

SUMMARY

Embodiments of the present invention are directed to automatic mobile device usage restriction. A non-limiting example computer-implemented method includes monitoring user data of a user of a mobile device from a plurality of data sources in the mobile device. The method also includes learning normal behavior of the user based on the monitoring. The method also includes identifying outlier behavior by the user that deviates from the normal behavior based on the monitoring. The method also includes determining a restriction state based on the outlier behavior. The method also includes restricting access to at least one functionality of the mobile device based on the restriction state.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide automatic mobile device usage restriction. Usage of a mobile device may be restricted based on detected current user behavior. The user's behavior may be detected by a restriction module based on user data that is gathered from one or more data sources in the mobile device. The user data may include but is not limited to location data, application usage data, time, location, typing patterns, and eye movements. A user's schedule and typical behavior may be learned by the restriction module to enable the restriction module to recognize outlier behavior in the user data. The restriction module may then determine, based on a confidence threshold, whether the outlier behavior indicates a restriction state (e.g., the user is in an impaired state). The identification of the restriction state may trigger automatic blocking, or revoking of permissions to, one or more functionalities or applications of the mobile device. Any appropriate user data that is available in the mobile device may be used to identify the outlier behavior. In some embodiments, the user may provide feedback to the restriction module regarding a restriction condition, for example, in instances where the suggested restriction is not accurate (i.e., is a false positive). The identification of the inaccurate restriction condition may be used to update restriction settings in the restriction module.

In some embodiments, the restriction module may learn, based on monitoring of the user's behavior, particular applications and functionalities of the mobile device that may be restricted in the restriction state. For example, applications and/or functionalities of the mobile device that are typically accessed during the user's working hours may be flagged as being associated with the user's employment, and therefore appropriate for restriction. In some embodiments, the user may indicate to the restriction module in the mobile device particular applications or functionalities that may be restricted, such as texting or calling a coworker or a manager.

Any available user data source in the mobile device may be taken into consideration by the restriction module to identify outlier behavior and determine whether the user should be restricted from accessing certain applications or completing certain tasks on their mobile device. For example, user data may be gathered using a global positioning system (GPS) module to track location, a trusted devices module to detect friends of the user nearby, a gyroscope to detect the user's movement or walking pattern, a retinal scan module to detect droopy eyes, and typing error detection on the keyboard. Various embodiments may automatically consider user data such as current location, time of day, typical application usage, trusted devices nearby, and social media relationships for detecting the user's state in order to determine whether or not to block specific actions, functionalities, and/or applications in real-time. To address false positives or false negatives, the user may be prompted for feedback. The user feedback may be used by the restriction module to determine confidence scores, which are compared to the confidence threshold. Monitoring the plurality of data sources to learn the behavior of the user over time may enable the restriction module to enter the restriction state without manual user input.

Figure 1:
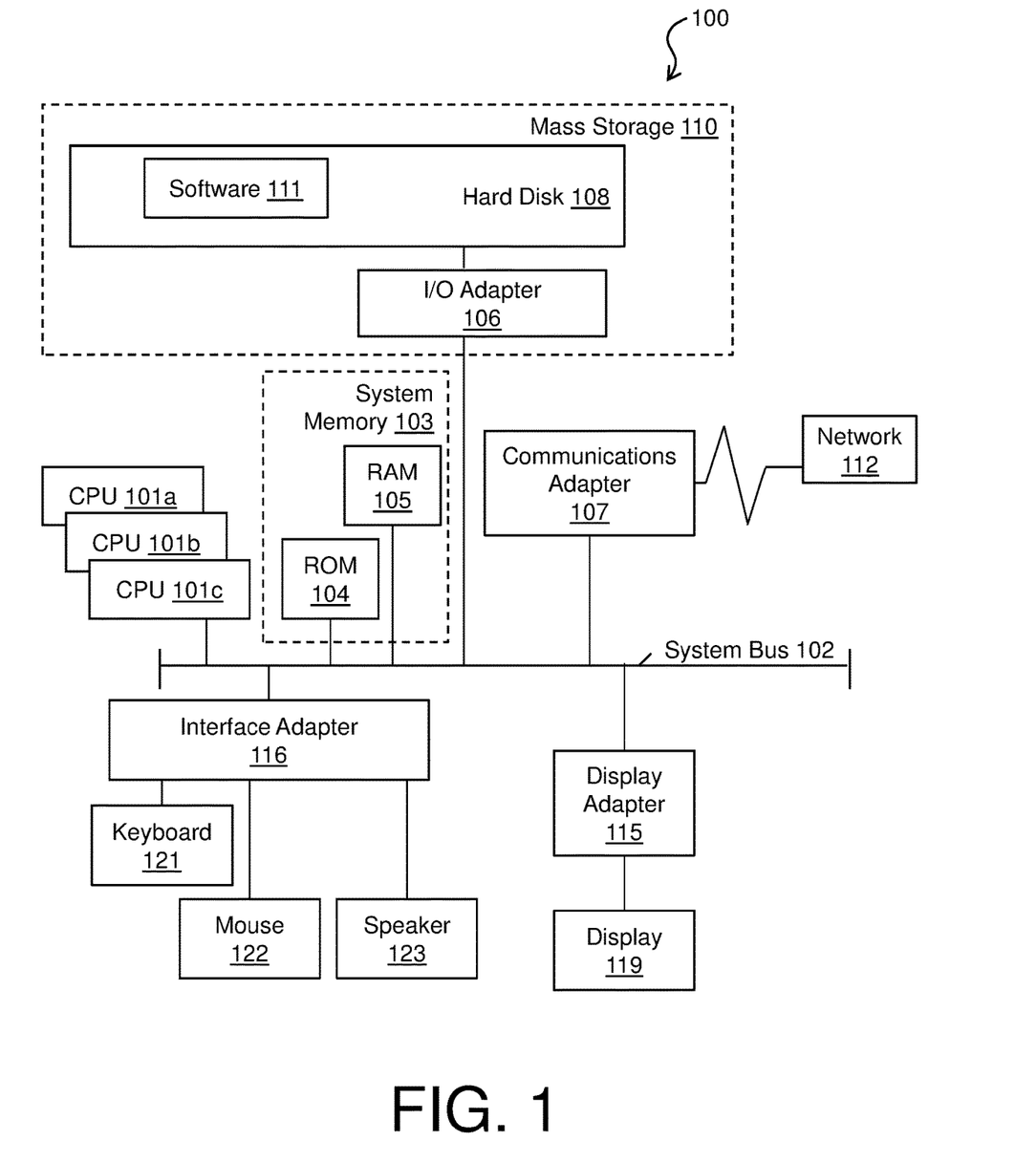
FIG. 1 is a block diagram of an example computer system for use in conjunction with one or more embodiments of automatic mobile device usage restriction.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
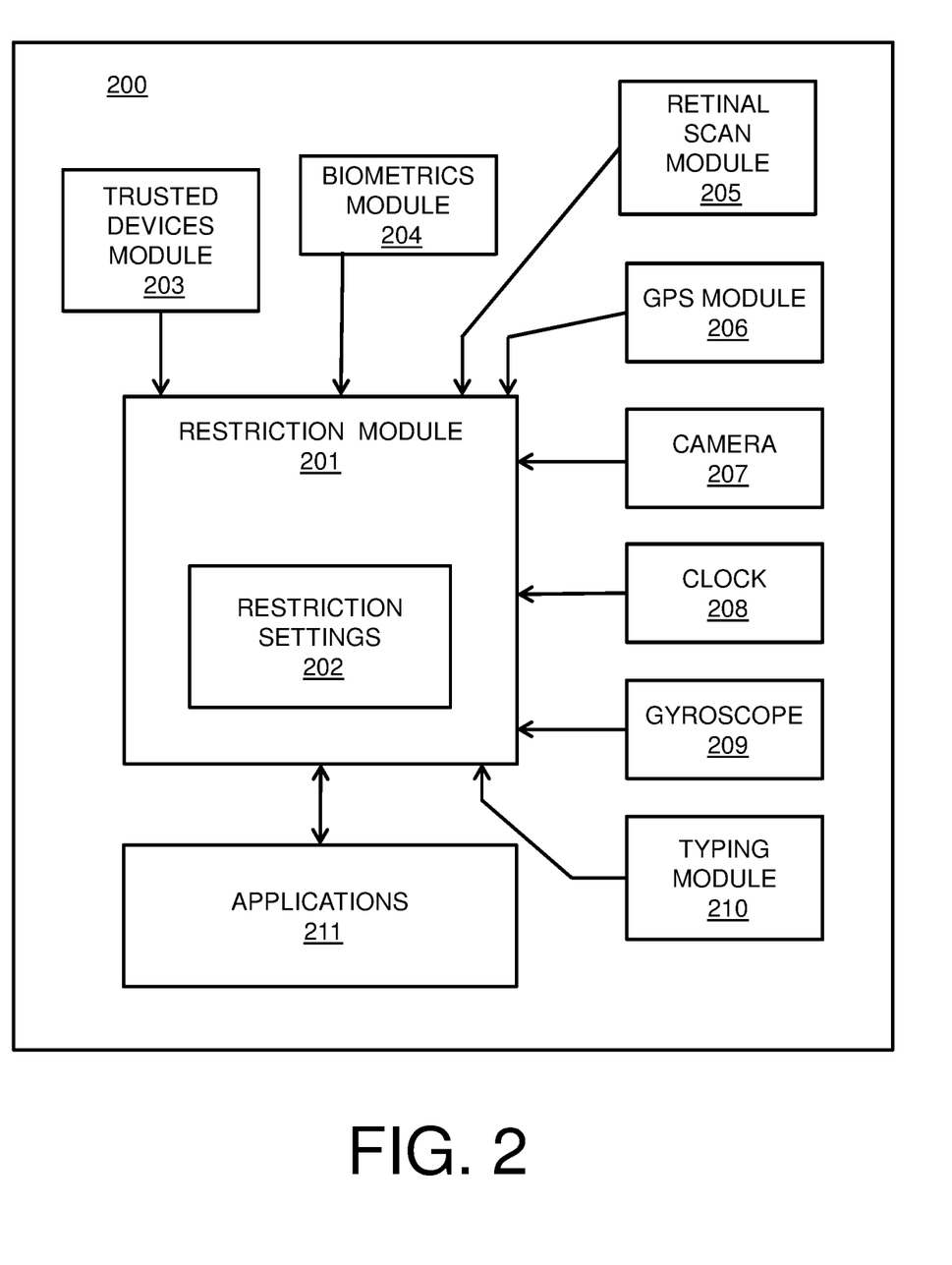
FIG. 2 is a block diagram of components of a system for automatic mobile device usage restriction in accordance with one or more embodiments of the present invention.

Turning now to FIG. 2, a system 200 that includes a mobile device with automatic mobile device usage restriction is generally shown in accordance with one or more embodiments of the present invention. System 200 may be implemented in conjunction with elements of any appropriate computer system, such as computer system 100 of FIG. 1. System 200 includes a restriction module 201 that includes restriction settings 202. The restriction settings 202 may be generated based on monitoring of the behavior of a user of system 200, and may specify outlier thresholds for user behavior that may be used to identify outlier behavior based on user data from data sources 203-210, and trigger restriction of access to one or more functionalities of applications 211. The restriction module 201 may be in communication with, and receive user data from, a plurality of data sources 203-210 in system 200. The data sources 203-210 as shown in FIG. 2 include trusted devices module 203, biometrics module 204, retinal scan module 205, GPS module 206, camera 207, clock 208, gyroscope 209, and typing module 210; any appropriate additional data sources may be in communication with restriction module 201 in various embodiments. The restriction module 201 may receive data regarding proximity to trusted devices from trusted devices module 203. For example, trusted devices module 203 may indicate to restriction module 201 that one or more trusted devices corresponding to friends of the user are within a predetermined physical proximity to the system 200. Biometrics module 204 may provide biometric data regarding the user to the restriction module 201, including but not limited a heart rate data and body temperature data. GPS module 206 may indicate a physical location of the user to the restriction module 201. Retinal scan module 205 may perform a retinal scan of the user that is provided to restriction module 201. Content of photographs or video taken by camera 207 may also be analyzed by restriction module 201 to determine a user's current activities or state (e.g., droopy eyes and/or dilated pupils in a selfie taken by the user). Clock 208 may provide a current time to the restriction module 201. Data regarding a user's physical movements (e.g., a walking pattern) may be determined by gyroscope 209 and provided to restriction module 201. Typing module 210 may determine the user's typing pattern or typing error rate, and provide the typing data to the restriction module 201.

The restriction module 201 may also monitor the usage of applications 211 by the user. The restriction module 201 may determine whether the user is using any applications that may indicate a restriction state (e.g., a social media app or a rideshare app). For example, the restriction module 201 may determine, based on a social media network app, that the user is participating in social activities (based on, for example, the user checking in or being tagged in a particular location or activity). The restriction module 201 may also determine particular functionalities of applications 211 that are typically accessed by the user at particular times of day (e.g., while the user is at work).

Restriction settings 202 may include one or more outlier thresholds associated with each of the modules in the system 200. The outlier thresholds may be determined based on monitoring and learning of the user's typical behavior over time by restriction module 201 based on data sources 203-210. The restriction settings 202 may be used to determine outlier behavior by the user. The restriction module 201 may then determine, based on a confidence score, whether the detected outlier behavior comprises a restriction state, in which the user may be blocked from using functionalities of one or more applications of applications 211. The restricted applications of applications 211 may be associated with a user's employment in some embodiments. The restriction module 201 may receive initial setup information from a user of the mobile device that comprises system 200, and may generate restriction settings 202 and a confidence threshold based on the setup information and monitoring of the user data from data sources 203-210. Operation of the restriction module 201 is discussed in further detail below with respect to method 300 of FIG. 3.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., data sources, applications, additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
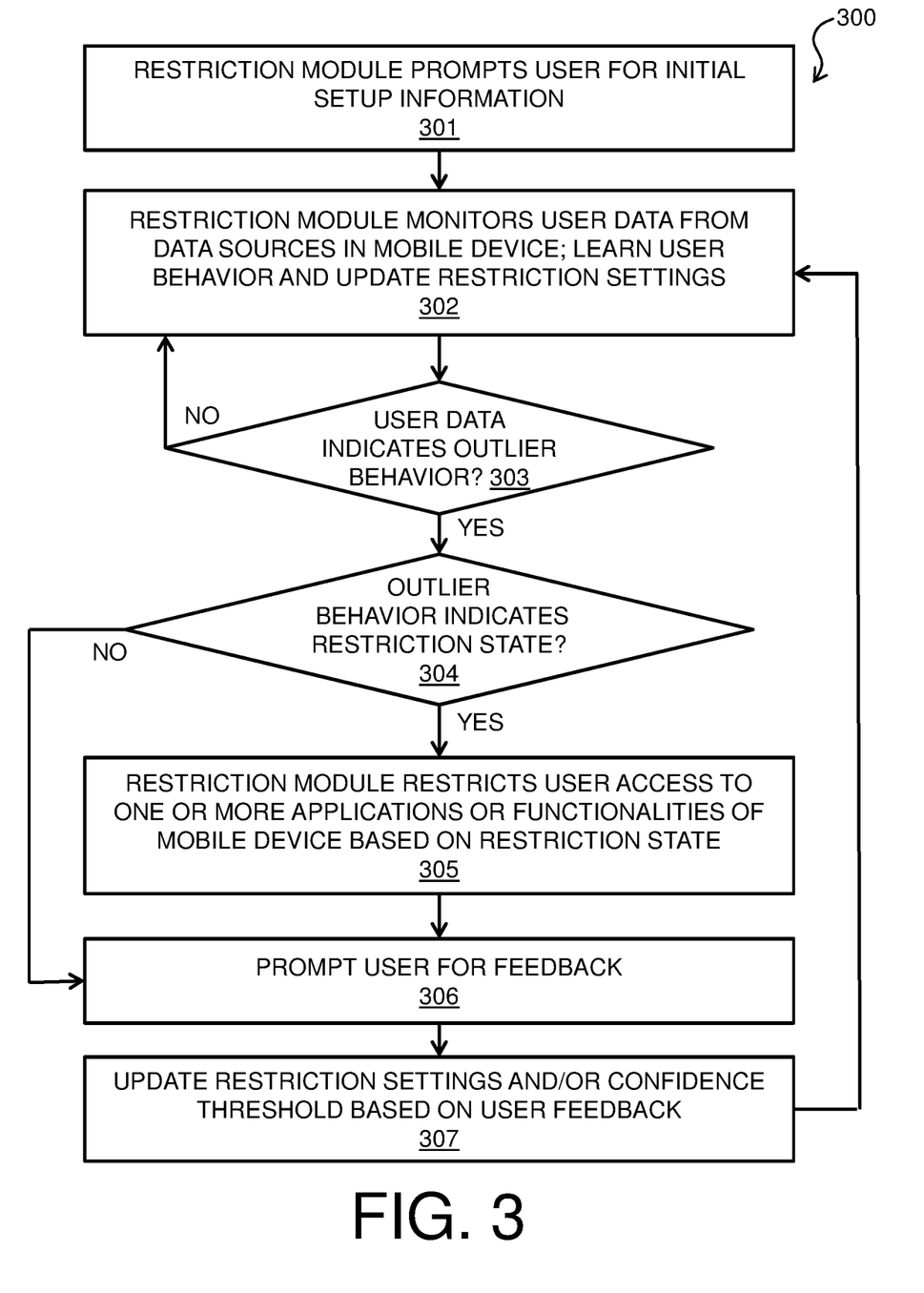
FIG. 3 is a flow diagram of a process for automatic mobile device usage restriction in accordance with one or more embodiments of the present invention.

FIG. 3 shows a process flow diagram of a method 300 for automatic mobile device usage restriction in accordance with one or more embodiments of the present invention. Method 300 may be implemented in, and is discussed with reference to, restriction module 201 in system 200 of FIG. 2. In block 301 of FIG. 3, the restriction module 201 prompts a user of the system 200, which may be a mobile device, for initial setup information. Block 301 may be triggered by installation of software corresponding to restriction module 201 in system 200 in some embodiments. The initial setup information may include any appropriate information regarding the user, such as the user's normal work hours, and a preferred restriction confidence threshold (e.g., the user may specify that the restriction module 201 restricts access to functionality of the system 200 based on a higher or lower confidence threshold in various embodiments). The initial setup information may also include particular applications or functionalities of system 200 that may be restricted by restriction module 201 in some embodiments (e.g., an app that is used to access an employer's internal information technology infrastructure, or texting or calling a manager or coworker of the user).

In block 302, during operation of the system 200, the restriction module 201 monitors user data from data sources 203-211 in system 200. The restriction module 201 may observe and learn the user's typical behavior based on the user data from data sources 203-211 in block 302, and may configure the restriction settings 202 based on the monitoring, and also based on the initial setup information that was received in block 301. For example, the restriction module 201 may determine that particular applications or functionalities of applications 211 are normally accessed by the user during normal work hours; these particular applications or functionalities may be flagged in restriction settings 202 as being associated with the user's employment, in addition to any applications or functionalities that were specified by the user as part of the initial setup information. The restriction module 201 may determine normal values for one or more types of user data based on the monitoring of block 302. For example, the restriction module 201 may determine a normal heart rate and/or body temperature for the user based on biometrics module 204 during the monitoring of block 302. The restriction module may set respective outlier thresholds in the restriction settings 202 for any of the data sources 203-210 that may be used to determine whether a restriction state exists.

Flow proceeds from block 302 to block 303. In block 303, the restriction module determines, based on data sources 203-210 and restriction settings 202, whether the user's current behavior is outlier behavior. The user data from any of data sources 203-210 may be compared to the data source's respective outlier threshold in restriction settings 202 in block 303. If it is determined in block 303 that the user's current behavior is not outlier behavior, flow proceeds from block 303 back to block 302, and the monitoring of the user data from data sources 203-210 by restriction module 201 continues. If it is determined in block 303 that the user's current behavior is outlier behavior, flow proceeds from block 303 to block 304.

In block 304, the restriction module 201 determines whether the outlier behavior indicates a restriction state. The restriction module 201 may determine a confidence score for the outlier behavior in block 304. The confidence score may be determined based on, for example, a number of data sources of data sources 203-210 that indicate outlier behavior. The restriction state may be determined in block 304 based on comparing the confidence score to a confidence threshold that was set in block 301 in some embodiments. For example, the confidence threshold may cause the restriction module to require that a predetermined number of data sources 203-210 each indicate the restriction state before restricting access to any of applications 211 (e.g., if the confidence threshold was set to high, a minimum of 5 data sources may be required to indicate outlier behavior before the restriction state is imposed; if the confidence threshold is lower, the restriction state may be imposed based on fewer data sources of data sources 203-210 indicating the outlier behavior). If it is determined in block 304 that the detected outlier behavior does not indicate the restriction state, flow proceeds from block 304 directly to block 306. If it is determined in block 304 that the outlier behavior indicates the restriction state, flow proceeds from block 304 to block 305.

In block 305, restriction module 201 imposes the restriction state, and restricts the user's access to one or more applications or functionalities of applications 211. The applications or functionalities that are restricted in block 305 may be selected based on being associated with the user's employment. In various embodiments, access to an entire application may be restricted by the restriction state (e.g., an app that grants the mobile device privileged access to an employer's information technology infrastructure), or access to a subset of the functionalities of an application may be restricted (e.g., particular contacts may be blocked in a texting app). The restriction state of block 305 may be imposed for any appropriate length of time. In some embodiments, the restriction state may end after elapsing of a predetermined amount of time. In some embodiments, the restriction state may end based on user data from any of data sources 203-210 indicating that the user's current behavior is no longer outlier behavior, based on restriction settings 202. Flow then proceeds from block 305 to block 306.

In block 306, restriction module 201 prompts the user for feedback based on the outlier behavior that was detected in block 303. If the restriction state was imposed in block 305, the user may also be prompted for feedback regarding the restriction state. In some embodiments, the prompting of block 306 may be performed after a predetermined amount of time has elapsed after detecting of the outlier behavior in block 303 (e.g., 24 hours), so as to avoid prompting the user for feedback while the outlier behavior exists. False positives and false negatives in the detecting of outlier behavior may be determined based on the prompting of block 306. In some embodiments, the user may also indicate a desired change to the confidence threshold for determining the restriction state in block 306. In some embodiments, the restriction module 201 may also periodically prompt the user for feedback, as is performed in block 306, without detection of outlier behavior. In block 307, the restriction settings 202 and/or confidence threshold may be updated based on the user feedback that was received in block 306. Flow then proceeds from block 307 to block 302, and the monitoring of the user data from data sources 203-210 by restriction module 201 continues. Blocks 302-307 of method 300 may be repeated throughout operation of the restriction module 201 in system 200.

For example, a user of system 200 is may be out with friends at night. The restriction module 201 may determine in block 303, based on GPS module 206, that the user's location is at a bar. The trusted device module 203 may indicate that one or more trusted devices corresponding to friends of the user are within a relatively close proximity to the system 200. Further, signs of impairment, such as balance, pupil dilation, and eye movements, may be detected via gyroscope 209 and camera 207. Biometrics such body temperature and heart rate may be determined by biometrics module 204 and used to detect outlier behavior comprising an impaired state. A higher than normal typing error rate may be determined by typing module 210. Based on the combination of time, location, detected trusted devices, detected signs of impairment, and typing error rate that each indicate outlier behavior, as determined based on restriction settings 202 in block 303 of method 300, the restriction module 201 may determine that the outlier behavior indicates a restriction state in block 304 of method 300 based on determining a confidence score for the outlier behavior and comparing the confidence score to a confidence threshold, and restrict the user's access to particular applications of applications 211 in block 305 of method 300. The restricted applications in block 305 may have been designated by the user, or may have been determined by restriction module 201 to be associated with the user's employment in some embodiments.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
monitoring, by a processor, user data of a user of a mobile device from a plurality of data sources in the mobile device;
learning normal behavior of the user based on the monitoring, wherein learning normal behavior of the user based on the monitoring comprises determining a respective outlier threshold for each of the plurality of data sources;
identifying outlier behavior by the user that deviates from the normal behavior based on the monitoring, wherein identifying the outlier behavior comprises comparing respective user data from a data source of the plurality of data sources to the respective outlier threshold of the data source;
determining a restriction state based on the outlier behavior, wherein determining the restriction state based on the outlier behavior comprises determining a confidence score corresponding to the outlier behavior, and comparing the confidence score to a confidence threshold; and
restricting access to at least one functionality of the mobile device based on the determining of the restriction state;
based on identifying the outlier behavior, waiting for a predetermined amount of time to elapse;
based on the elapsing of the predetermined amount of time, prompting the user for first feedback regarding the identified outlier behavior via the mobile device, wherein the user is not prompted for the first feedback while the identified outlier behavior exists; and
updating the confidence threshold based on the first feedback from the user.

2. The method of claim 1, wherein the plurality of data sources comprises a trusted devices module, a biometrics module, a retinal scan module, a global positioning system (GPS) module, a camera, a clock, a gyroscope, and a typing module.

3. The method of claim 1, wherein the confidence threshold comprises a minimum number of data sources of the plurality of data sources that indicate the outlier behavior.

4. The method of claim 1, further comprising monitoring application usage of the user of the mobile device, and flagging the at least one functionality of the mobile device for restricted access based on the monitoring of the application usage, wherein the flagged at least one functionality corresponds to an employment of the user.

5. The method of claim 1, further comprising:
periodically prompting the user for second feedback via the mobile device in the absence of identification of outlier behavior; and
updating the confidence threshold based on the second feedback from the user.

6. The method of claim 5, further comprising:
determining, based on the second feedback, that an absence of identification of outlier behavior comprises a false negative.

7. The method of claim 1, further comprising:
determining, based on the first feedback, that the determined restriction state comprises a false positive.

8. A system comprising:
a memory having computer readable instructions; and
one or more processors for executing the computer readable instructions, the computer readable instructions controlling the one or more processors to perform operations comprising:
monitoring user data of a user of a mobile device from a plurality of data sources in the mobile device;
learning normal behavior of the user based on the monitoring, wherein learning normal behavior of the user based on the monitoring comprises determining a respective outlier threshold for each of the plurality of data sources;
identifying outlier behavior by the user that deviates from the normal behavior based on the monitoring, wherein identifying the outlier behavior comprises comparing respective user data from a data source of the plurality of data sources to the respective outlier threshold of the data source;
determining a restriction state based on the outlier behavior, wherein determining the restriction state based on the outlier behavior comprises determining a confidence score corresponding to the outlier behavior, and comparing the confidence score to a confidence threshold; and
restricting access to at least one functionality of the mobile device based on the determining of the restriction state;
based on identifying the outlier behavior, waiting for a predetermined amount of time to elapse;
based on the elapsing of the predetermined amount of time, prompting the user for first feedback regarding the identified outlier behavior via the mobile device, wherein the user is not prompted for the first feedback while the identified outlier behavior exists; and
updating the confidence threshold based on the first feedback from the user.

9. The system of claim 8, wherein the plurality of data sources comprises a trusted devices module, a biometrics module, a retinal scan module, a global positioning system (GPS) module, a camera, a clock, a gyroscope, and a typing module.

10. The system of claim 8, wherein the confidence threshold comprises a minimum number of data sources of the plurality of data sources that indicate the outlier behavior.

11. The system of claim 8, further comprising monitoring application usage of the user of the mobile device, and flagging the at least one functionality of the mobile device for restricted access based on the monitoring of the application usage, wherein the flagged at least one functionality corresponds to an employment of the user.

12. The system of claim 8, further comprising:
periodically prompting the user for second feedback via the mobile device in the absence of identification of outlier behavior; and
updating the confidence threshold based on the second feedback from the user.

13. The system of claim 8, further comprising:
determining, based on the first feedback, that the determined restriction state comprises a false positive.

14. The system of claim 8, further comprising:
determining, based on the second feedback, that an absence of identification of outlier behavior comprises a false negative.

15. A computer program product comprising a computer readable storage medium having program instructions embodied therewith, the program instructions executable by a processor to cause the processor to perform operations comprising:
monitoring user data of a user of a mobile device from a plurality of data sources in the mobile device;
learning normal behavior of the user based on the monitoring, wherein learning normal behavior of the user based on the monitoring comprises determining a respective outlier threshold for each of the plurality of data sources;
identifying outlier behavior by the user that deviates from the normal behavior based on the monitoring, wherein identifying the outlier behavior comprises comparing respective user data from a data source of the plurality of data sources to the respective outlier threshold of the data source;
determining a restriction state based on the outlier behavior, wherein determining the restriction state based on the outlier behavior comprises determining a confidence score corresponding to the outlier behavior, and comparing the confidence score to a confidence threshold; and
restricting access to at least one functionality of the mobile device based on the determining of the restriction state based on identifying the outlier behavior, waiting for a predetermined amount of time to elapse;
based on the elapsing of the predetermined amount of time, prompting the user for first feedback regarding the identified outlier behavior via the mobile device, wherein the user is not prompted for the first feedback while the identified outlier behavior exists; and
updating the confidence threshold based on the first feedback from the user.

16. The computer program product of claim 15, wherein the plurality of data sources comprises a trusted devices module, a biometrics module, a retinal scan module, a global positioning system (GPS) module, a camera, a clock, a gyroscope, and a typing module.

17. The computer program product of claim 15, wherein the confidence threshold comprises a minimum number of data sources of the plurality of data sources that indicate the outlier behavior.

18. The computer program product of claim 15, further comprising monitoring application usage of the user of the mobile device, and flagging the at least one functionality of the mobile device for restricted access based on the monitoring of the application usage, wherein the flagged at least one functionality corresponds to an employment of the user.

19. The computer program product of claim 15, further comprising:
determining, based on the first feedback, that the determined restriction state comprises a false positive.

20. The computer program product of claim 15, further comprising:
periodically prompting the user for second feedback via the mobile device in the absence of identification of outlier behavior;
updating the confidence threshold based on the second feedback from the user; and
determining, based on the second feedback, that an absence of identification of outlier behavior comprises a false negative.

* * * * *